(12) United States Patent
Basso et al.

(10) Patent No.: US 7,903,687 B2
(45) Date of Patent: Mar. 8, 2011

(54) METHOD FOR SCHEDULING, WRITING, AND READING DATA INSIDE THE PARTITIONED BUFFER OF A SWITCH, ROUTER OR PACKET PROCESSING DEVICE

(75) Inventors: Claude Basso, Raleigh, NC (US); Jean Louis Calvignac, Raleigh, NC (US); Chih-jen Chang, Apex, NC (US); Philippe Damon, Raleigh, NC (US); Natarajan Vaidhyanathan, Carrboro, NC (US); Fabrice Jean Verplanken, La Gaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/096,363

(22) Filed: Apr. 1, 2005

(65) Prior Publication Data

US 2006/0221989 A1    Oct. 5, 2006

(51) Int. Cl.
*H04J 3/16* (2006.01)
*H04J 3/22* (2006.01)
*H04J 3/24* (2006.01)

(52) U.S. Cl. .................. 370/471; 370/473; 370/474
(58) Field of Classification Search .................. 370/60, 370/84, 218, 230, 235, 392, 395, 412, 428, 370/470–474; 709/233; 710/5, 6, 56, 58, 710/60, 71; 712/405
See application file for complete search history.

(56) References Cited

U.S. PATENT DOCUMENTS

| | | | |
|---|---|---|---|
| 4,825,406 A | 4/1989 | Bean et al. |
| 5,058,110 A | 10/1991 | Beach et al. |
| 5,172,371 A | 12/1992 | Eng et al. |
| 5,359,659 A | 10/1994 | Rosenthal |
| 5,430,842 A | 7/1995 | Thompson et al. |
| 5,442,802 A | 8/1995 | Brent et al. |
| 5,752,078 A | 5/1998 | Delp et al. |
| 5,983,274 A | 11/1999 | Hyder et al. |
| 5,991,299 A | 11/1999 | Radogna et al. |
| 6,041,058 A | 3/2000 | Flanders et al. |
| 6,266,700 B1 | 7/2001 | Baker et al. |
| 6,400,730 B1 | 6/2002 | Latif et al. |

(Continued)

FOREIGN PATENT DOCUMENTS

WO      03049488 A1    6/2003

OTHER PUBLICATIONS

Kung, H. T., "Gigabit Local Area Networks: A Systems Perspective", Apr. 1992, IEE Communications Magazine, vol. 30 Issue 4, pp. 79-89.*

(Continued)

*Primary Examiner* — Kwang B Yao
*Assistant Examiner* — Adam Duda
(74) *Attorney, Agent, or Firm* — Jason O. Piche; Jeffrey L. Streets (57) ABSTRACT

A method for receiving packets in a computer network are disclosed. The method include providing at least one receive port, a buffer, a scheduler, and a wrap port. The buffer has an input coupled with the at least one receive port and an output. The scheduler has a first input coupled to the output of the buffer, a second input coupled to the wrap port, and an output.

18 Claims, 11 Drawing Sheets

U.S. PATENT DOCUMENTS

| | | | |
|---|---|---|---|
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 | 1/2004 | Russell et al. | |
| 6,724,769 B1 * | 4/2004 | Sang | 370/429 |
| 6,728,929 B1 | 4/2004 | Luong | |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 * | 9/2004 | Aweya et al. | 370/412 |
| 6,795,870 B1 * | 9/2004 | Bass et al. | 710/6 |
| 6,822,968 B1 | 11/2004 | Lim | |
| 6,937,574 B1 | 8/2005 | Delaney et al. | |
| 6,954,463 B1 | 10/2005 | Ma et al. | |
| 6,970,419 B1 | 11/2005 | Kalkunte et al. | |
| 6,976,205 B1 | 12/2005 | Ziai et al. | |
| 6,988,235 B2 | 1/2006 | Brown | |
| 7,023,811 B2 | 4/2006 | Pinto | |
| 7,031,304 B1 | 4/2006 | Arberg et al. | |
| 7,062,570 B2 | 6/2006 | Hong et al. | |
| 7,098,685 B1 | 8/2006 | Agrawal et al. | |
| 7,124,198 B2 | 10/2006 | Pinkerton | |
| 7,131,140 B1 | 10/2006 | O'Rourke et al. | |
| 7,134,796 B2 | 11/2006 | Anderson | |
| 7,164,678 B2 | 1/2007 | Connor | |
| 7,218,632 B1 | 5/2007 | Bechtolsheim et al. | |
| 7,251,704 B2 | 7/2007 | Solomon | |
| 7,260,120 B2 | 8/2007 | Kang et al. | |
| 7,269,661 B2 | 9/2007 | Ree et al. | |
| 7,271,706 B2 | 9/2007 | Lee | |
| 7,274,706 B1 | 9/2007 | Nguyen et al. | |
| 7,283,528 B1 | 10/2007 | Lim et al. | |
| 7,286,557 B2 | 10/2007 | Feuerstraeter et al. | |
| 7,292,586 B2 | 11/2007 | Dewan et al. | |
| 7,292,591 B2 | 11/2007 | Parker et al. | |
| 7,295,553 B2 * | 11/2007 | Saitoh | 370/392 |
| 7,298,761 B2 | 11/2007 | Hong | |
| 7,308,006 B1 | 12/2007 | Banerjee et al. | |
| 7,349,399 B1 | 3/2008 | Chen et al. | |
| 7,360,217 B2 | 4/2008 | Melvin et al. | |
| 7,366,194 B2 | 4/2008 | Yu et al. | |
| 2001/0027496 A1 | 10/2001 | Boucher et al. | |
| 2002/0048270 A1 * | 4/2002 | Allen et al. | 370/392 |
| 2002/0099855 A1 * | 7/2002 | Bass et al. | 709/249 |
| 2003/0022792 A1 | 1/2003 | Hacker | |
| 2003/0026252 A1 | 2/2003 | Thunquest et al. | |
| 2003/0088689 A1 | 5/2003 | Alexander et al. | |
| 2003/0103499 A1 | 6/2003 | Davis et al. | |
| 2003/0154399 A1 | 8/2003 | Zuk et al. | |
| 2003/0227920 A1 | 12/2003 | Benayoun et al. | |
| 2004/0022094 A1 | 2/2004 | Radhakrishnan et al. | |
| 2004/0030766 A1 | 2/2004 | Witkowski | |
| 2004/0064590 A1 | 4/2004 | Starr et al. | |
| 2004/0081145 A1 | 4/2004 | Harrekilde-Peterson et al. | |
| 2004/0100952 A1 | 5/2004 | Boucher et al. | |
| 2004/0109465 A1 | 6/2004 | Kim et al. | |
| 2004/0128398 A1 | 7/2004 | Pettey | |
| 2004/0177275 A1 | 9/2004 | Rose et al. | |
| 2004/0218623 A1 | 11/2004 | Goldenberg et al. | |
| 2005/0022017 A1 | 1/2005 | Maufer et al. | |
| 2005/0076136 A1 | 4/2005 | Cho et al. | |
| 2005/0089031 A1 | 4/2005 | Krueger | |
| 2005/0108611 A1 | 5/2005 | Vogt | |
| 2005/0114663 A1 | 5/2005 | Cornell et al. | |
| 2005/0120160 A1 | 6/2005 | Plouffe et al. | |
| 2005/0149677 A1 | 7/2005 | Shimada et al. | |
| 2005/0174153 A1 | 8/2005 | Saeki | |
| 2005/0256975 A1 | 11/2005 | Kaniz et al. | |
| 2006/0031600 A1 | 2/2006 | Ellis et al. | |
| 2006/0120289 A1 | 6/2006 | Cunningham | |
| 2006/0187928 A1 | 8/2006 | McGee et al. | |
| 2006/0216958 A1 | 9/2006 | Yee et al. | |

OTHER PUBLICATIONS

Cunningham, D. G., "The Status of the 10-Gigabit Ethernet Standard", 2001, 27the European Conference on Optical Communication, 2001. ECOC '01, vol. 3, pp. 364-367.*

Touch, Implementing the Internet Checksum in Hardware, RFC 1936, Apr. 1996.

Mazzucco, The Fundamentals of Cache, SystemLogic.Net, Oct. 17, 2000.

IP Com, Reusing a 10Gbps Ethernet Media Access Controller for a 1Gbps/100Mbps Ethernet, located at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Balena, Francesco, "Speed up searched with hash tablets," Nov. 13, 2001, DevX.com, all pages.

Balena, F., "Speed up searched with hash tables," Nov. 13, 2001, DevX.com all pages.

Acayan, Joseph, "Facsimile Transmital", Apr. 22, 2008, Sayer Law Group, LLP, 1 page.

* cited by examiner

METHOD FOR SCHEDULING, WRITING, AND READING DATA INSIDE THE PARTITIONED BUFFER OF A SWITCH, ROUTER OR PACKET PROCESSING DEVICE

FIELD OF THE INVENTION

The present invention relates to computer networks, and more particularly to a method and system for accommodating several Ethernet ports in conjunction with a wrap transmitted flow.

CROSS-REFERENCE TO RELATED APPLICATIONS

The present application is related to the following copending U.S. patent applications:

U.S. patent application, Ser No. 11/097,608, entitled "Host Ethernet Adapter for Networking Offload in Server Environment", filed on even date herewith and assigned to the assignee of the present invention.

U.S. patent application, Ser. No. 11/096,571, entitled "Method and Apparatus for Providing a Network Connection Table", filed on even date herewith and assigned to the assignee of the present invention.

U.S. patent application, Ser. No. 11/097,051, entitled "Network Communications for Operating System Partitions", filed on even date herewith and assigned to the assignee of the present invention.

U.S. patent application, Ser. No. 11/097,652, entitled "Configurable Ports for a Host Ethernet Adapter", filed on even date herewith and assigned to the assignee of the present invention.

U.S. patent application, Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application, Ser. No. 11/096,353, entitled "System and Method for a Method for Reducing Latency in a Host Ethernet Adapter (HEA)", filed on even date herewith and assigned to the assignee of the present invention.

U.S. patent application, Ser. No. 11/097,055, entitled "Method and Apparatus for Blind Checksum and Correction for Network Transmissions", filed on even date herewith and assigned to the assignee of the present invention.

U.S. patent application, Ser. No. 11/096,362, entitled "Method and System for Performing a Packet Header Lookup", filed on even date herewith and assigned to the assignee of the present invention.

U.S. patent application, Ser. No. 11/097,430, entitled "System and Method for Computing a Blind Checksum in a Host Ethernet Adapter (HEA)", filed on even date herewith and assigned to the assignee of the present invention.

BACKGROUND OF THE INVENTION

Figure 1:
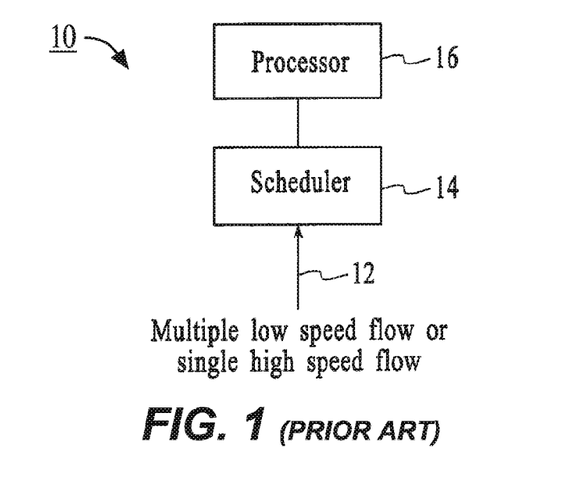
FIG. 1 is a diagram of a conventional system for performing a packet header lookup.

FIG. 1 depicts a conventional system 10 for receiving packets in a computer network. The conventional system 10 includes receive port(s) 12, scheduler 14, and processor 16. Packets received from the port(s) 12 are provided to the scheduler 14. The port(s) 12 might be a single high speed port, such as a ten gigabit per second port, or multiple low speed ports, such as dual one gigabit per second ports. The scheduler 14 utilizes a heuristic for determining which packets from what port are to be provided to the processor 16. The processor 16 performs the desired processing on the packets.

Although the conventional system functions, one of ordinary skill in the art will readily recognize that there are drawbacks. In order to provide packets to different applications in the system, the packet is transmitted back out to the network, then received back by the conventional system 10. Consequently, delays may be introduced. Furthermore, the received traffic, including packets transmitted back out to the network, is not regulated by the conventional system 10. As a result, received packets may be dropped, which is undesirable.

Accordingly, what is needed is a more efficient method and system for handling traffic for multiple applications as well as for multiple low-speed flows or a single high-speed flow. The present invention addresses such a need.

BRIEF SUMMARY OF THE INVENTION

The present invention provides a method and system for receiving packets in a computer network. The method and system comprise providing at least one receive port, a buffer, a scheduler, and a wrap port. The buffer has an input coupled with the at least one receive port and an output. The scheduler has a first input coupled to the output of the buffer, a second input coupled to the wrap port, and an output.

According to the method and system disclosed herein, the present invention may improve the efficiency of the transmission of packets in a network.

DETAILED DESCRIPTION OF THE INVENTION

The present invention relates to computer networks. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for receiving packets in a computer network. The method and system comprise providing at least one receive port, a buffer, a scheduler, and a wrap port. The buffer has an input coupled with the at least one receive port and an output. The scheduler has a first input coupled to the output of the buffer, a second input coupled to the wrap port, and an output.

The present invention will be described in terms of a particular computer system. However, one of ordinary skill in the art will readily recognize that the method and system in accordance with the present invention can be incorporated into another computer system having different and/or other components.

Figure 2:
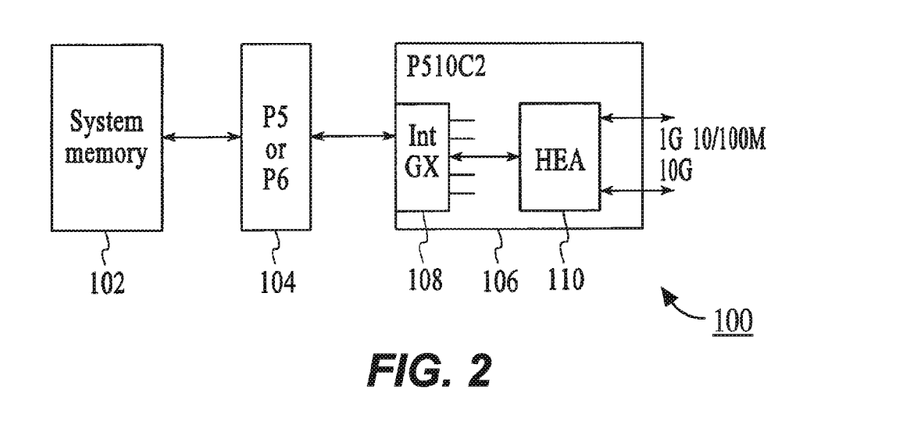
FIG. 2 is a block diagram of a server system in accordance with the present invention.

FIG. 2 is a block diagram of a server system 100 in accordance with the present invention. The server system 100 includes a processor 102 which is coupled between a memory 104 and an interface adapter chip 106. The interface adapter chip 106 includes an interface 108 to the private (Gx) bus of the processor 102 and a Host Ethernet Adapter (HEA) 110. The HEA 110 receives and transmits signals from and to the processor 102.

The HEA 110 is an integrated Ethernet adapter. A set of accelerator features are provided such that a TCP/IP stack within the servers uses those features when and as required. The interface between the processor 102 and the interface adapter chip 106 has been streamlined by bypassing the PCI bus and providing interface techniques that enable demultiplexing and multiqueueing and packet header separation. In so doing an Ethernet adapter is provided that allows for improved functionality with high speed system while allowing for compatibility with legacy server environments. Some of the key features of this improved functionality are described hereinbelow.

Acceleration Functions

The HEA 110 supports advanced acceleration features. One key observation is that the current acceleration functions do a good job on the transmit side (e.g. transmitting packets from the processor) but not a very good job on the receive side (e.g. receiving packets via the adapter). The HEA 110 addresses this gap by introducing new features such as Packet Demultiplexing and Multiqueueing, and Header separation.

All of the HEA 110 new features are optional; it is up to the TCP/IP stack to take advantage of them if and when required. For example, a vanilla TCP/IP stack can use the HEA 110 without using per the connection queueing feature and yet take advantage of the other features of HEA such as throughput, low latency and virtualization support.

Packets Demultiplexing and Multiqueueing

Multiqueueing and Demultiplexing is the key feature to support functions such as virtualization, per connection queueing, and OS bypass. HEA demultiplexing uses the concept of Queue Pairs, Completion Queues and Event Queues. Enhancements have been added to better address OS protocol stacks requirements and short packet latency reduction.

Depending upon system requirements and configuration, HEA can demultiplex incoming packets based on:
- Destination MAC address (typically one MAC address and one default queue per partition)
- Connection identifier for established connections (Protocol, Source IP address, Destination IP address, Source port, Destination port).
- Destination port and optionally destination IP address for TCP connection setup packet (SYN).

Packet Header Separation

HEA is optionally capable of separating the TCP/IP header from the data payload. This feature allows the header to be directed to the protocol stack for processing without polluting the received buffers posted by the applications. This feature is a component required for enabling zero-copy operations.

Enhanced Features

Many enhanced features are provided by the HEA 110 in the server environment. Some of these features are listed below.

(a) Multiple Receive Queue: The queue pair concept is extended to support more than one receive queue per pair. This enables the stack to better manage its buffer pool memory. For example, one queue can be assigned to small packets, one to medium packets and one to large packets. The HEA will select the ad hoc queue according to the received packet size.

(b) Low Latency Queue: On the transmit side a descriptor (WQE) may contain immediate data, in such case no indirection, i.e., no additional DMA from system memory is required to get the data to be sent. On the receive side, low latency queues do not supply buffers but rather receive immediate packet data. The HEA writes to the receive queue rather than reading. Short packets take advantage of this feature leading to a dramatic reduction of DMA operations: one single DMA write per packet as opposed to one DMA read and one DMA write per packet.

(c) Receive low latency queues are also used to support the packet header separation: the header is written in the low latency queue while the payload is DMAed to a buffer indicated in the ad-hoc receive queues.

In summary, Demultiplexing and Multiqueueing, Address Translation and Packet Header Separation are the basic building blocks to virtualization and provide low latency in operation. Furthermore, it should be noted that these features can also be used to improve traditional OS protocol stack performance, for example, per-connection queueing allows for the removal of code and more importantly the memory accesses—and associated stalls/cache pollution—consumed to locate the TCP connection control block (TCB) in the system memory.

To describe the features of the HEA 110 in more detail refer now to the following description in conjunction with the accompanying figures.

Figure 3:
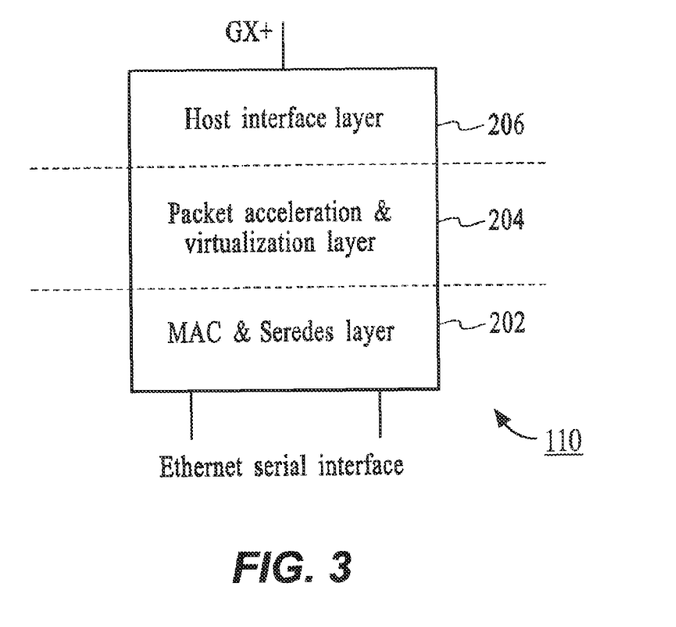
FIG. 3 is a simple block diagram of one embodiment of the host Ethernet adapter in accordance with the present invention.

FIG. 3 is a simple block diagram of the HEA 110 in accordance with the present invention. As is seen the HEA 110 has a three layer architecture. The first layer comprises a Media Access Controller (MAC) and Serialization/Deserialization (Serdes) Layer 202 which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or a 1 Gigabit interface.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operation. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor. The layer 206 provides for multiple receive sub-queues per Queue Pair (QP) to enable effective buffer management for a TCP stack. The host layer 206 provides the context management for a given flow of data packets.

To describe the features of each of the layers 202, 204 and 206 of the HEA 100 in more detail refer now to the following discussions in conjunction with the accompanying figures.

MAC and Serdes Layer 202

Figure 4:
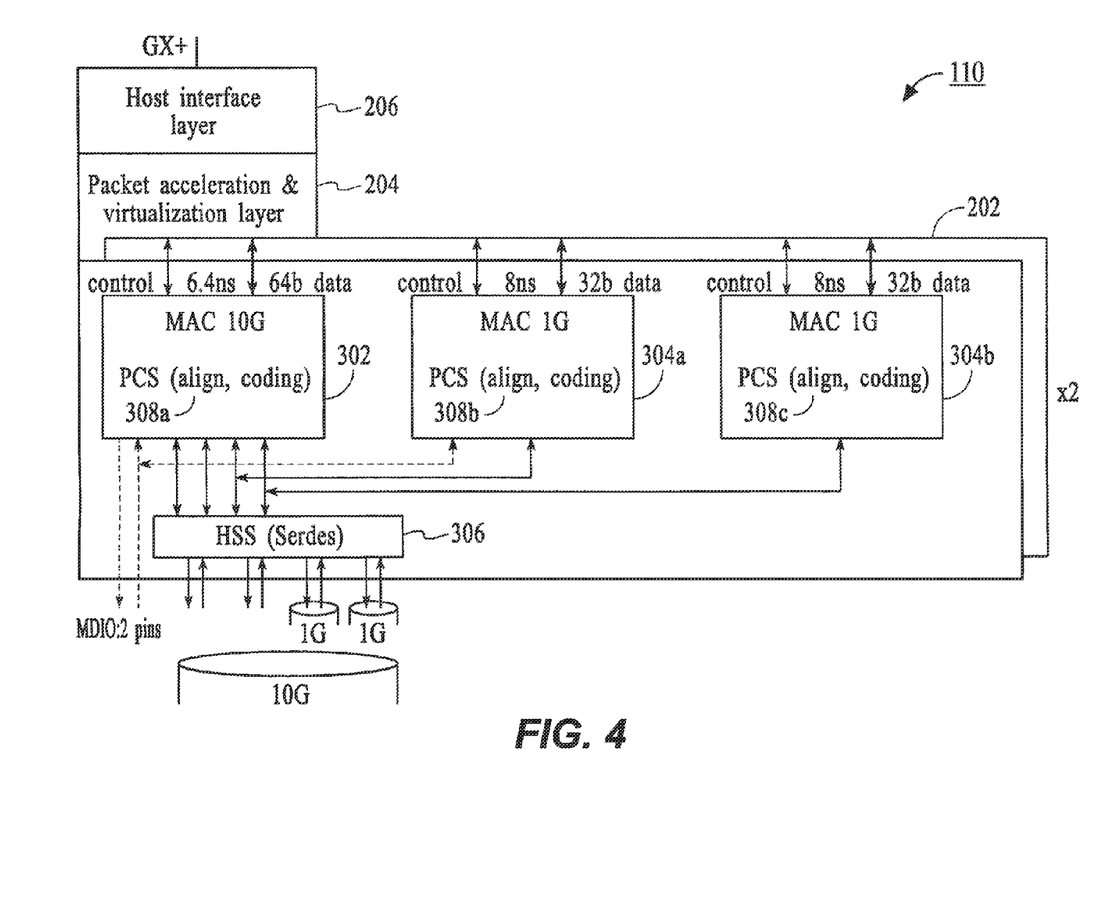
FIG. 4 is a block diagram of one embodiment of the host Ethernet adapter in accordance with the present invention with a more detailed view of the MAC and Serdes Layer.

FIG. 4 is a block diagram of the HEA 110 with a more detailed view of the MAC and Serdes Layer 202. As is seen in this embodiment there is one 10 Gigabit MAC 302 and four 1 Gigabit MACs 304a and 304b. The MACs 302, 304 and 304b include analog coding units 308a, 308b and 308c for aligning and coding the packets received. The MACs 302, 304a and 304b are coupled to a High Speed Serializer/deserialization (HSS) 306. The HSS 306 is capable of receiving data from one 10 Gigabit source or four 1 Gigabit sources.

RxNet Overview

This section shows the high level structure and flow through the receive Ethernet function within layer 202. The Rx accelerator unit 400 as will be explained in more detail hereinafter is part of Packet Acceleration and Virtualization layer 204.

Figure 5:
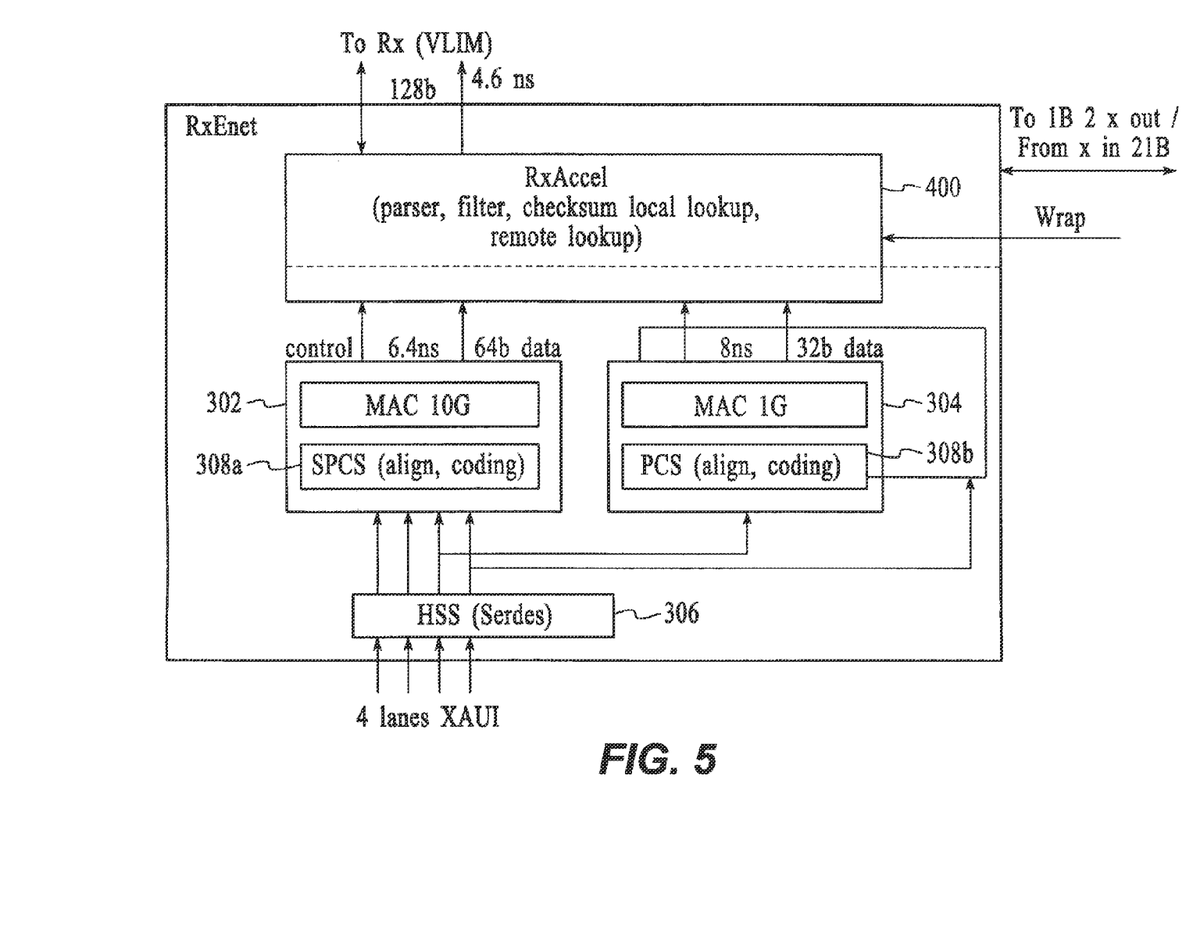
FIG. 5 shows the components and dataflow for one embodiment of RxNet in accordance with the present invention.

FIG. 5 shows the components and dataflow for one of RxNet. Data arrives on the XAUI interface and is processed by the HSS 306, analog coding units 308a and 308b and MAC which assembles and aligns the packet data in this embodiment in a 64 bit (10 G) or 32 bit (1 G) parallel data bus. Control signals are also generated which indicate start and end of frame and other packet information. The data and control pass through the RxAccel unit 400 which performs parsing, filtering, checksum and lookup functions in preparation for processing by the Receive Packet Processor (RPP) of the layer 206 (FIG. 3). In this embodiment, the clock is converted to a 4.6 ns clock and the data width is converted to 128b as it enters the RxAccel unit 400.

As data flows through the RxAccel unit 400 to the Virtual Lane Interface Manager (VLIM). data buffers, the RxAccel unit 400 snoops on the control and data and starts its processing. The data flow is delayed in the RxAccel unit 400 such that the results of the RxAccel unit 400 are synchronized with the end of the packet. At this time, the results of the RxAccel unit 400 are passed to the VLIM command queue along with some original control information from the MAC. This control information is stored along with the data in the VLIM.

If the RxAccel unit 400 does not have the lookup entry cached, it may need to go to main memory through the GX bus interface (not shown). The GX bus operates at 4.6 ns. The VLIM can asynchronously read the queue pair resolution information from the RxAccel unit 400.

TxEnet Overview

This section provides an overview of the transmit structure and flow through Ethernet and Acceleration functions. The Tx accelerator unit 500 as will be explained in more detail hereinafter is part of Packet Acceleration and Virtualization layer 204.

Figure 6:
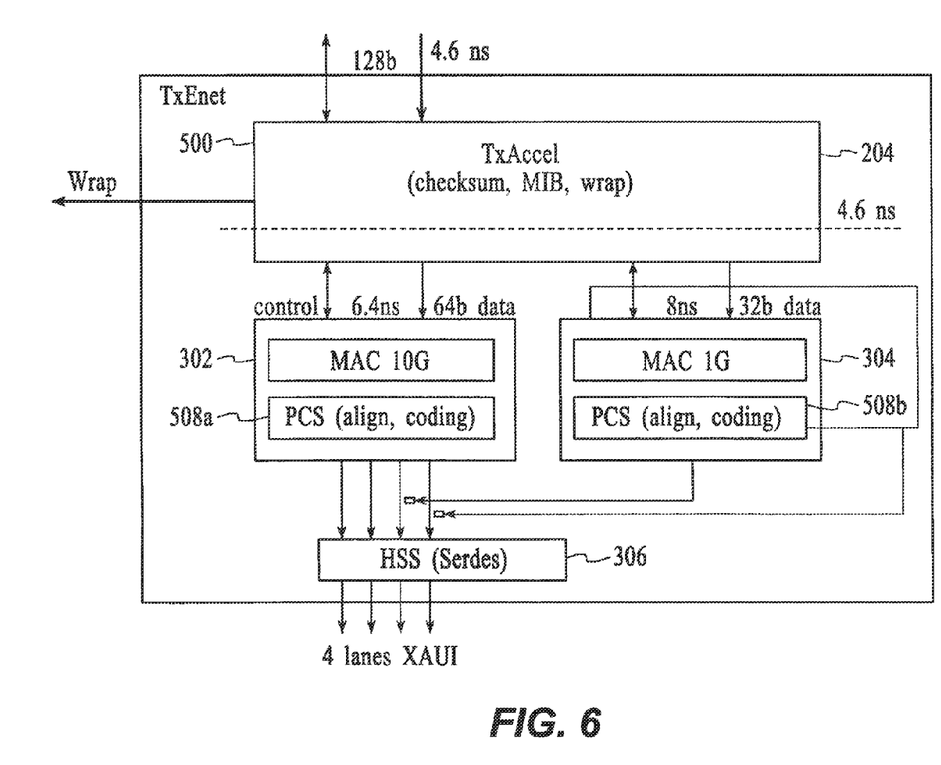
FIG. 6 shows the components and dataflow for one embodiment of TxEnet in accordance with the present invention.

FIG. 6 shows the components and dataflow for one TxEnet. Packet data and control arrives from the ENop component of the HEA 110. The Tx Accelerator (TxAccel) unit 500 interprets the control information and modifies fields in the Packet Header. It makes the wrap versus port decision based on control information or information found in the Packet Header. It also generates the appropriate controls for the TxMAC 302 and 304. The data flow is delayed in the TxAccel unit 500 such that the TxAccel unit 500 can update Packet Headers before flowing to the MAC 302 and 304. At the exit, the data width is converted from 128 bits to 64 bits (10 G) or 32 bits (1 G). The data and control pass through a clock conversion function in the TxAccel unit 500 in order to enter the differing clock domain of the MAC 302. The MAC 302 and 304, analog converters 508a and 508b and HSS 306 format packets for the Ethernet XAUI interface.

Packet Acceleration and Virtualization Layer 204

Figure 7:
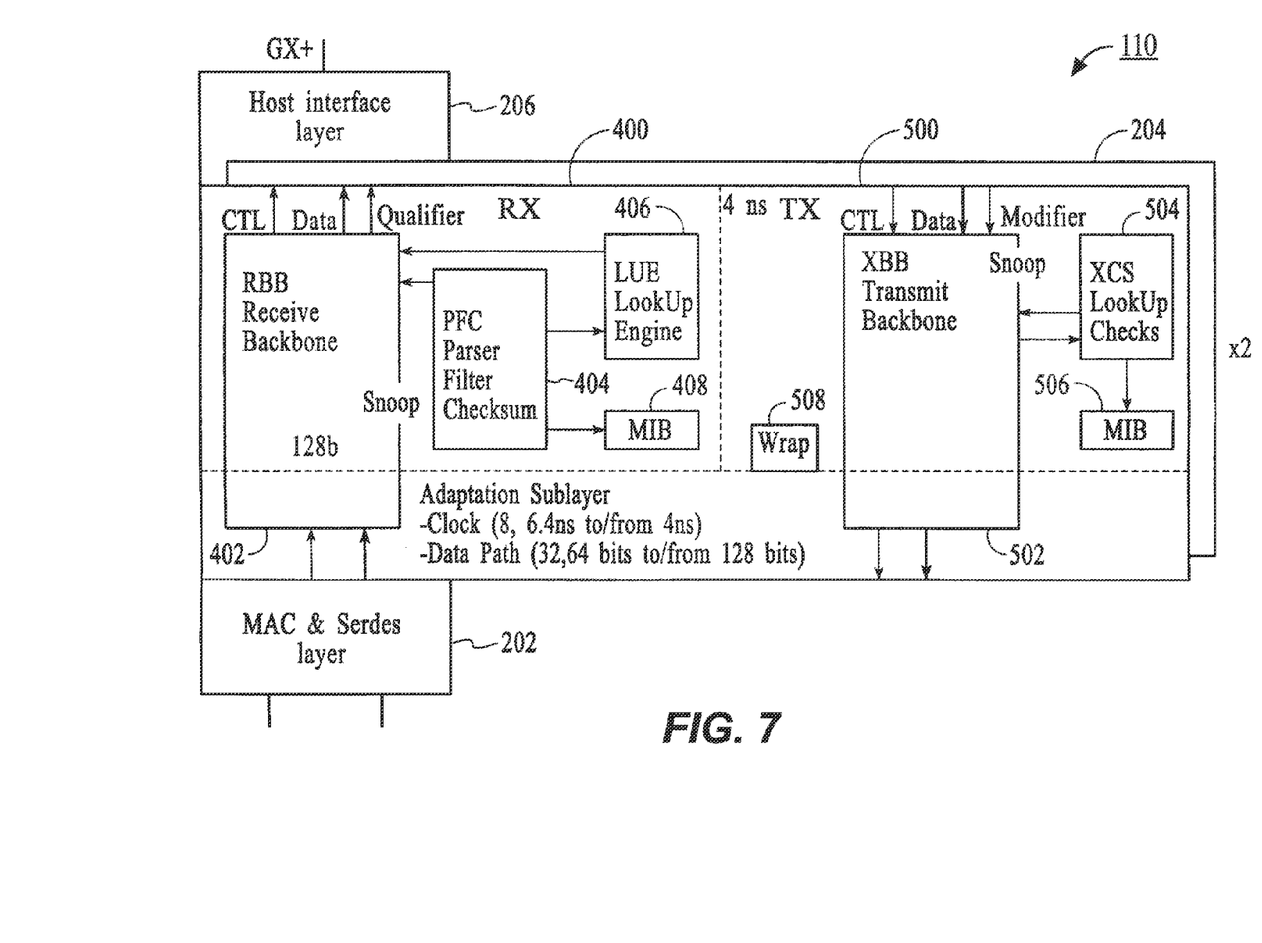
FIG. 7 is a block diagram of one embodiment of the host Ethernet adapter in accordance with the present invention with a more detailed view of the Packet Acceleration and Visualization Layer.

FIG. 7 is a block diagram of the HEA 110 with a more detailed view of the Packet Acceleration and Visualization Layer 204. The HEA Layer 204 comprises a receive (RxAccel) acceleration unit 400 and a transmit acceleration (TxAccel) unit 500. The RxAccel unit 400 comprises a receive backbone (RBB) 402, a parser filter checksum unit (PFC) 404, a lookup engine (LUE) 406 and a MIB database 408. The TxAccel unit 500 comprises the transmit backbone 502, lookup checks 504 and an MIB engine 506. The operation of the Rx acceleration unit 400 and the Tx acceleration unit 500 will be described in more detail hereinbelow.

Receive Acceleration (Rx) Unit 400

Figure 8:
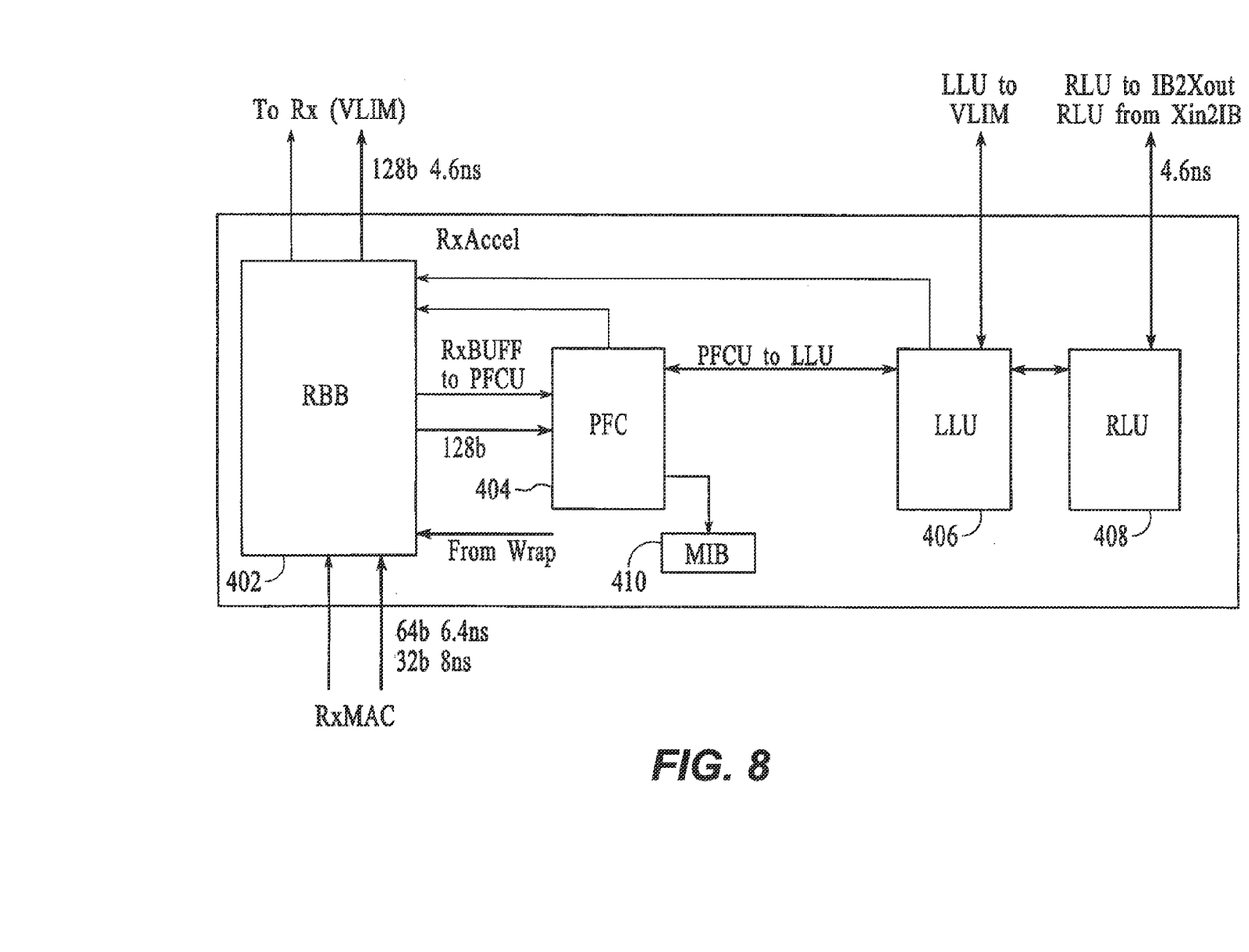
FIG. 8 shows one embodiment of the RxAccel unit in accordance with the present invention.

FIG. 8 shows that the RxAccel unit 400 is composed of the Receive Backbone (RBB) 402, the Parser, Filter and Checksum Unit (PFC) 404, the Local Lookup Unit (LLU) 406, the Remote Lookup Unit (RLU) 408 and an MIB database 410.

Data flows through the RxAccel from the RxMAC unaltered. The RBB 402 manages the flow of data and is responsible for the clock and data bus width conversion functions. Control and Data received from the RxMAC is used by the PFC 404 to perform acceleration functions and to make a discard decision. The PFC 404 passes control and data extracted from the frame, including the 5-tuple key, to the LLU 406 in order to resolve a Queue Pair number (QPN) for the RBB 402. The LLU 406 either finds the QPN immediately or allocates a cache entry to reserve the slot. If the current key is not in the cache, the LLU 406 searches for the key in main store. The PFC 404 interfaces to the MIB database 410 to store packet statistics.

Tx Acceleration 500

This section describes the high level structure and flow through the Transmit Acceleration unit 500 (TxAccel).

Figure 9:
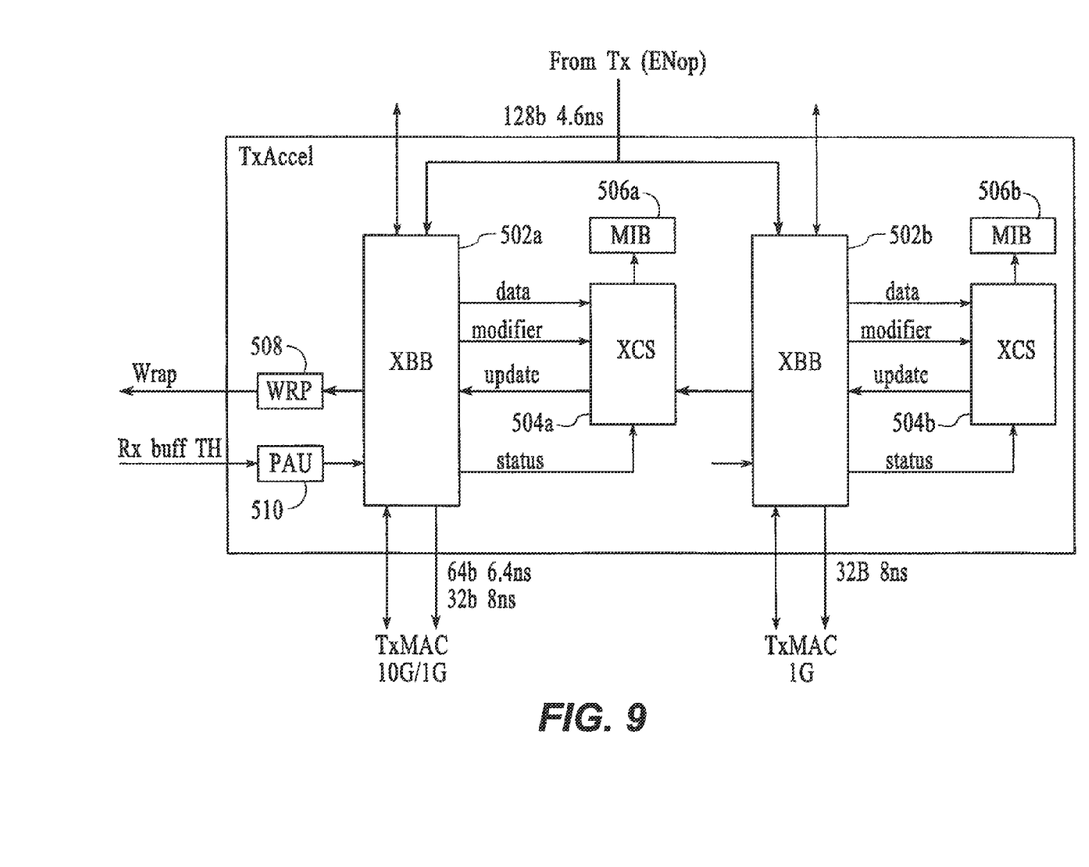
FIG. 9 shows one embodiment of the TxAccel unit in accordance with the present invention.

FIG. 9 shows that the TxAccel unit 500 is composed of two Transmit Backbones (XBB) 502a and 502b, two Transmit Checksum units (XCS) 504a and 504b, two Transmit MIBs 506a and 506b, one Wrap Unit (WRP) 508 and one Pause Unit (PAU) logic 510. Data flows through the TxAccel from the ENop and is modified to adjust the IP and TCP checksum fields. The XBB 502a and 502b manages the flow of data and is responsible for the clock and data bus width conversion functions. Control and Data received from the ENop is used by the XCS 504a and 504b to perform checksum functions. After the packet is transmitted (or discarded) by the MAC, the transmit status returns to the TxAccel for accounting. The XBB transforms the information to the clock domain of the TxAccel. The status information is merged with original information obtained from the packet by the XCS and passed to the MIB Counter logic 506*a* and 506*b*. The MIB logic 506*a* and 506*b* updates the appropriate counters in the MIB array. The Wrap Unit (WRP) 508 is responsible for transferring to the receive side packets XCSs 504*a* and 504*b* have decided to wrap. The Pause Unit (PAU) 510 orders the MAC to transmit pause frames based on the receive buffer's occupancy.

Host Interface Layer 206

Figure 10:
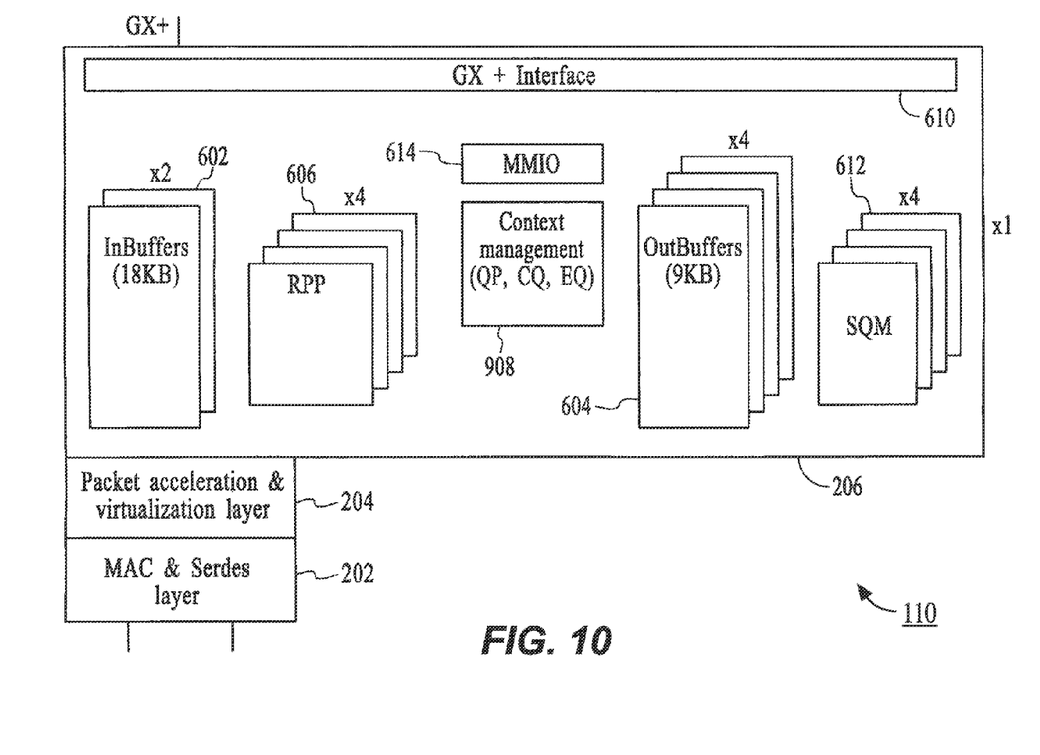
FIG. 10 is a block diagram of one embodiment of the host Ethernet adapter in accordance with the present invention with a more detailed view of the Host Interface Layer.

FIG. 10 is a block diagram of the HEA 110 with a more detailed view of the Host Interface Layer 206. The Host Interface Layer 206 includes input and output buffers 602 and 604 for receiving packets from the layer 204 and providing packets to layer 204. The layer 206 includes a Receive Packet Processor (RPP) 606 for appropriately processing the packets in the input buffer. The context management mechanism 908 provides multiple sub-queues per queue prior to enable effective buffer management for the TCP stack.

Demultiplexing Function

The Rx unit 400 of layer 204 in conjunction with components of the host interface layer 206 provides the packets to the appropriate portion of the processor. Accordingly, the received packets must be demultiplexed to ensure that they flow to the appropriate portion of the server.

To describe the details of this demultiplexing function refer now to the following in conjunction with FIG. 8 and FIG. 9.

Demultiplexing Implementation on the HEA Adapter

Before the Receive Packet Processor (RPP) 606 can work on a received packet, the queue pair context must be retrieved. The QP connection manager does this using a QP number. Since QP numbers are not transported in TCP/IP packets, it must be determined by other means. There are two general classes of QPs, a per-connection QP and a default QP.

Per-connection QP are intended to be used for long-lived connections where fragmentation of the IP packets is not expected and for which low-latency is expected. They require that the application utilize a user-space sockets library which supports the user-spacing queueing mechanism provided by the HEA 110. The logical port must first be found using the destination MAC address. Three types of lookup exist for per-connection QP:

1. New TCP connections for a particular destination IP address and destination TCP port. A lookup is performed based on the TCP/IP (DA, DP, Logical port) if the packet was a TCP SYN packet.

2. New TCP connections for a particular destination TCP port only (disregarding DA). A lookup is performed based on the TCP/IP (DP, Logical port) if the packet was a TCP SYN packet.

3. Existing TCP/UDP connection. A lookup is performed based on the TCP/IP 5-tuple plus the logical port if the packet was a non-fragmented unicast TCP or UDP packet.

Default QP are used if no per-connection QP can be found for the packet or if per-connection lookup is not enabled for a MAC address or if the packet is a recirculated multicast/broadcast packet. Generally default QP are handled by the kernel networking stack in the OS or hypervisor. These types of default QP exist in the HEA 110:

1. Default OS queue per logical port. (A logical port corresponds to a logical Ethernet interface with its own default queue. Each logical port has a separate port on the logical switch. There could be one or more logical ports belonging to an LPAR.)

A lookup is performed based on MAC address.

A direct index (logical port number) to the default OS queue is provided with recirculated (wrapped) multicast/broadcast packets.

2. Multicast (MC) or Broadcast (BC) queue.

A configured value if the packet is a multicast or broadcast packet which does not match one of the MAC addresses in the MAC lookup table.

3. Super-default Unicast (UC) queue.

If a UC packet does not match one of the configured MAC addresses, a default UC QPN may be used.

This mechanism allows for flexibility between the two extremes of queueing per connection and queueing per logical port (OS queue). Both models can operate together with some connections having their own queueing and some connections being queued with the default logical port queues.

Connection lookup is performed by the RxAccel unit 400. One such unit exists for each port group. Within the RxAccel unit 400, each component performs a portion of the process. The PFC 404 extracts the needed fields from the packet header and determines the logical port number based on the destination MAC address. The Local Lookup Unit (LLU) 406 and Remote Lookup Unit (RLU) 408 are then responsible for resolving the QP number. The LLU 406 attempts to find a QPN using local resources only (cache and registers).

The purpose of the LLU 406 is to attempt to determine the QP number associated with the received packet. The QP number is required by the VLIM and RPP 606. It performs this task locally if possible (i.e. without going to system memory).

The QP number can be found locally in one of several ways:

Lookup in TS cache
Default partition QP
Default UC QP

If no match is found locally, then a preliminary check is made on the negative cache to see if the entry might be in present in system memory. If so, the RLU 408 is invoked to perform the search. If the RLU 408 is busy, a queue of requests can be formed which will be provided to the RLU 408 as it becomes free.

The LLU 406 communicates with the RBB 402 providing the QP number and/or the queue index to use for temporary queueing. If no eligible entries are available in the cache, the LLU 406 indicates to the RBB 402 that the search is busy. The packet must be dropped in this case.

The LLU 406 provides the QPN to the VLIM/unloader when a queue index resolution is requested and has been resolved. The RLU attempts to find a QPN using system memory tables.

The LLU utilizes a local 64 entry cache in order to find the QPN for TCP/UDP packets. If the entry is found in the cache, the RLU 408 does not need to be invoked. If the entry is not found in the cache, a preliminary check is made in the negative cache to see if the entry might be in the connection table. The negative cache is useful for eliminating unnecessary accesses to main memory when there are a few number of configured queues (note: since the size of the negative cache is small, it is only useful when the number of entries in the table is relatively small, that is, significantly less than 1K. As the number of entries approaches and exceeds 1K, the negative cache will become all is, thus making it non-useful. The purpose of the negative cache is to not penalize the OS queries when there are a small number of QP. A problem may arise when there are small number of active QP but a large number of configured QP. The OS queues will suffer in this case.) (e.g., when using most OS queues).

If the RLU 408 is invoked, it uses a hash of the 6-tuple (including logical port number) to fetch an 128 byte Direct Table (DT) entry. This DT entry contains up to eight 6-tuple patterns and associated QPN. If a match is found, no further action is required. If there are more than 8 patterns associated with this hash value, then a Collision Overflow Table (COT) entry may need to be fetched for additional patterns. If a match is found, the LLU 406 cache is updated with the found QPN.

When the RLU 408 must be invoked, the QPN can not be determined on the fly as the packet is being placed into the input buffers. In fact the QPN may be determined several packets later. For this reason, the RxAccel unit 400 may either provide a QPN or a queue index to the VLIM for packet queueing. If a QPN is provided, then the VLIM (unloader) may queue the packet directly for work by the RPP. If a queue index is provided, then the VLIM (unloader) must hold this packet to wait for resolution of the QPN. The QPN is always determined by the time the RPP is dispatched.

SYN packet lookup (2 or 3 tuple) uses the same cache and lookup tables as the 6-tuple lookup. Here is the rationale and key design points:

Perf requirements are relaxed (not real steady state) so we can access multiple times to the System memory Reuse 6 tuples Look Up resources (tables)

Use the 3-tuple to find the cache index for SYN packets to ensure that all packets added to this cache list belong to the same QP, whether matching 3-tuple, 2-tuple or none. Using this 6-tuple isn't good since if a non-SYN came in, it would get added to the list and be routed to the 3/2 tuple QP. Using a two-tuple would not work since the packet may end up not matching the two-tuple. Multiple packets with the same 2-tuple may get added to the list in this cache entry and may end up being moved to the wrong QP.

A check is NOT made for 6-tuple match when packet is a SYN. It is left to the host to check for connection already open on a SYN.

Connection Setup

If 2 tuple SYN routing (LPAR, DP), this pattern is installed in the table as <logical_port#, DA=0, DP, SA=0, SP=0, prot=0> (TCP=0)

If 3 tuple SYN routing (LPAR, DP, DA), this pattern is installed in the table as <logical_port#, DA, DP, SA=0, SP=0, prot=0> BUT install it in the DT at the index given by 2 tuple (i.e. DA=0).

Figure 11:
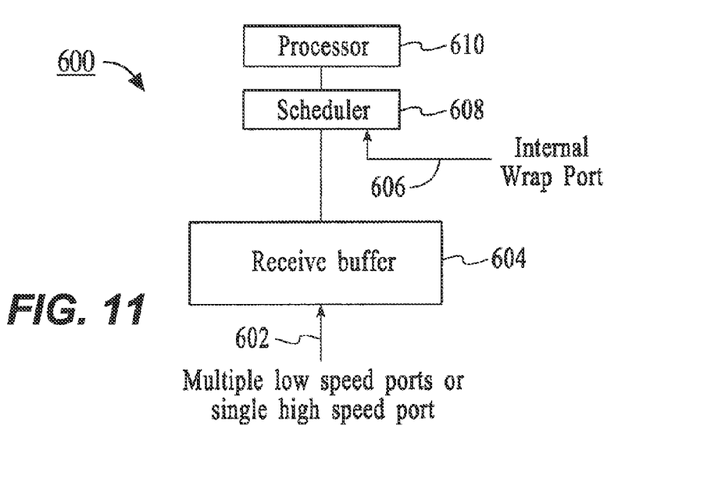
FIG. 11 is a block diagram of one embodiment of the host Ethernet adapter in accordance with the present invention with a more detailed view of the components used in receiving packets.

To more particularly describe the present invention, refer to FIG. 11. FIG. 11 is a block diagram of one embodiment of a portion of a HEA 110 in accordance with the present invention with a more detailed view of the components 600 used in receiving packets. The system 600 includes at least one receive port 602, a receive buffer 604, an internal wrap port 606, a scheduler 608, and a processor 610.

The receive port(s) 602 are preferably either a single high speed flow port (e.g. a ten gigabit per second port) or multiple low speed flow ports (e.g. dual one gigabit per second ports). Because the receive port(s) 602 receive packets from external sources, the rate at which packets are provided to the receive port(s) 602 is not controlled by the system 600. Packets received from the port(s) 602 are provided to the receive buffer 604. The receive buffer 604 is preferably a first-in-first-out (FIFO) SRAM. The receive buffer 604 is also preferably accessed in 128-bits sections. The internal wrap port 606 provides packets from the transmit side (not shown in FIG. 11) directly to the receive side. Because the internal wrap port 606 is from the transmit side, the rate at which wrap packets are received in the internal wrap port 606 can be controlled. The output of the buffer 604 and the internal wrap port 606 are provided as inputs to the scheduler 608. The scheduler 608 provides its output to the processor 610. The scheduler also selects between the inputs provided by the receive buffer 604 and the internal wrap port 606.

The term "wrap" is really an abbreviation for "wrap-back" which is related to the path going directly from the transmit side of a network interface to the receive side of the same interface, as opposed to regular paths which are from the transmit side of a network interface to the external link and from the link to the receive side of the network interface. So, "wrap port", for example is really the hardware logic between the transmit and receive sides of a network interface to carry packets on this wrap-back path. These packets can thus be referred to as "wrap packets". This term is described in paragraph (60) of cross-referenced U.S. patent application Ser. No 11/097,051 entitled "Network Communications for Operating System Partitions, incorporated herein by reference.

In operation, received packets are provided from the receive port(s) 602 to the receive buffer 604. Depending upon the amount of data in the receive buffer 604 and whether the internal wrap port 606 has a packet waiting to be received, the scheduler 608 can select from which input to read packets. Thus, either a received packet from the receive buffer 604 or a wrap packet from the internal wrap port 606 may be read by the scheduler 608. In addition, in the embodiment shown in FIG. 11, there is no interleaving of packet data between the internal wrap port 606 and the receive port(s) 602.

Through the use of the internal wrap port 606, packets can be transmitted back to the receive side without accessing the network. Thus, communication between applications of the computer system is allowed without requiring the packets to be transmitted over the network. Furthermore, the use of the receive buffer 604 may allow the packets from the receive port(s) 602 to be stored while the scheduler 608 is busy either with a packet from the internal wrap port 606 or with another packet from the receive buffer 604. Thus, there may be fewer dropped packets from the receive port(s) 602. Consequently, performance is improved.

Figure 12:
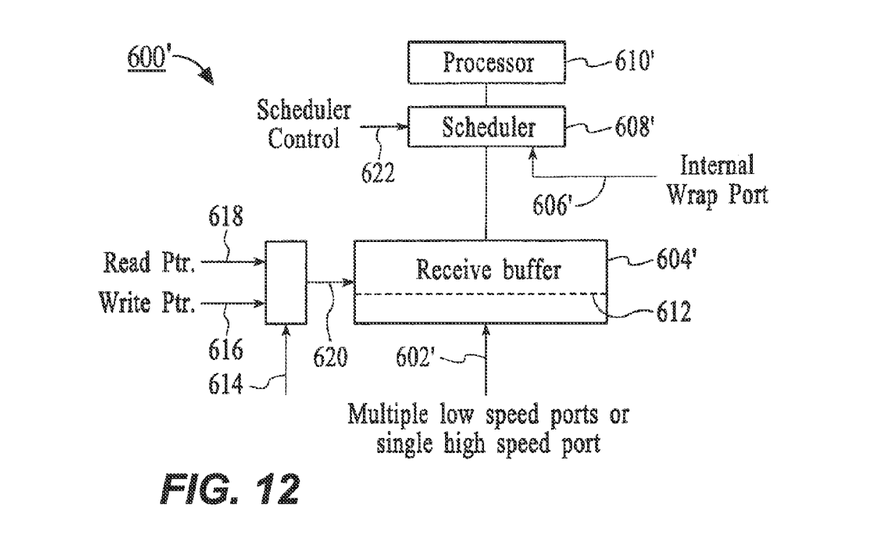
FIG. 12 is a block diagram of one embodiment of the host Ethernet adapter in accordance with the present invention with a more detailed view of the components used in receiving packets for a single ten gigabits per second receive port.

FIG. 12 is a block diagram of one embodiment of the host Ethernet adapter in accordance with the present invention with a more detailed view of the components 600' used in receiving packets for a single ten gigabits per second receive port. The system 600' includes a high-speed receive port 602', a receive buffer 604', an internal wrap port 606', and a scheduler 608'. These components 602', 604', 606', and 608' are analogous to the components 602, 604, 606, and 608, respectively, in FIG. 11. Referring back to FIG. 12, also depicted is the threshold 612, read/write control signal 614, write pointer 616, read pointer 608, port address 620, and scheduler control line 622.

The port 602' is a high speed port, such as a ten gigabit per second port. The receive buffer 604' is preferably a FIFO SRAM. The receive buffer 604' is preferably accessed in 128-bits sections. The read pointer 618 points to the portion of the receive buffer 604' being read from to provide a packet to the scheduler 608'. The write pointer 616 points to the portion of the receive buffer 604' being written to receive a packet from the receive port 602'.

The system 600' functions as the system 600. Thus, an incoming packet from the receive port 602' is written to the receive buffer 604'. The scheduler 608' reads from either the receive buffer 604' or the internal wrap port 606'. Note that in a preferred embodiment, the entire packet need not be accumulated in the receive buffer 604' unless the wrap port 606' is currently receiving a wrap packet that is provided to the scheduler 608'. Thus, the receive buffer 604' may be read almost as soon as the data is written. In such situations, the receive buffer 604' is virtually bypassed. The scheduler 608' preferably selects between the receive buffer 604' and the internal wrap port 606' using the following criteria. If there is no internal wrap packet and the receive buffer 604' is not empty, then the receive buffer 604' is preferably read. In such an embodiment, if a wrap packet arrives during the reading, receipt of the wrap packet in the internal wrap port 606' is preferably blocked. If there is an internal wrap packet at the internal wrap port 606', the buffer is not empty but the threshold 612 has not been reached, the scheduler 608' preferably alternatively reads from the buffer and the wrap port, in a round-robin fashion. In such a case, the packet received at the port 602' will be accumulated in the receive buffer 604' while the wrap packet is being read by the scheduler 610'. If the threshold 612 has been reached or exceeded in the receive buffer 602', the scheduler 610' preferably reads the packet from the receive buffer 602'. Once the scheduler 608' has read the packet, the scheduler can provide the packet to the processor 610 (not shown in FIG. 12).

Through the use of the internal wrap port 606', packets can be transmitted back to the receive side without accessing the network. Thus, communication between applications of the computer system is allowed without requiring the packets to be transmitted over the network. Furthermore, the use of the receive buffer 604' may allow the packets from the high speed receive port 602' to be stored. Thus, there may be fewer dropped packets from the high speed receive port 602'. Consequently, performance is improved.

Figure 13:
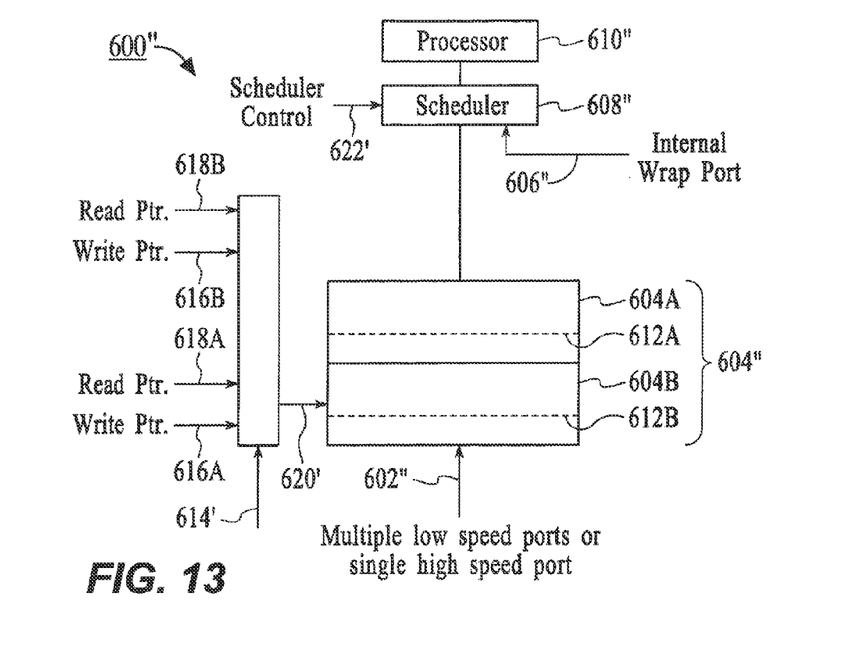
FIG. 13 is a block diagram of one embodiment of the host Ethernet adapter in accordance with the present invention with a more detailed view of the components used in receiving packets for dual one gigabit per second receive ports.

FIG. 13 is a block diagram of one embodiment of the host Ethernet adapter in accordance with the present invention with a more detailed view of the components 600" used in receiving packets for dual one gigabit per second receive ports. The system 600" includes a dual low speed receive ports 602", a receive buffer 604", an internal wrap port 606", and a scheduler 608". These components 602", 604", 606", and 608" are analogous to the components 602, 604, 606, and 608, respectively, in FIG. 11. Referring back to FIG. 13, also depicted are the thresholds 612A and 621B, read/write control signal 614', write pointers 616A and 616B, read pointers 618A and 618B, port address 620', and scheduler control line 622'.

The ports 602" are dual low speed ports, such as a pair of one gigabit per second ports. The receive buffer 604" is preferably a FIFO SRAM. The receive buffer 604" is logically split to divide the capacity of the receive buffer 604" between the port 602A and the port 602B. Thus, the receive buffer 604" is preferably divided in half. Each section 604A and 604B has a corresponding threshold 612A and 612B, respectively. Each section 604A and 604B of the receive buffer 604" is preferably accessed in 128-bits sections. The read pointers 618A and 618B point to the portion of the receive buffer 604" corresponding to the port 602A and 602B, respectively, being read from to provide a packet to the scheduler 608'. The write pointers 616A and 616B point to the portion of the receive buffer 604' being written to receive a packet from the receive port 602A or 602B, respectively.

The system 600' functions similarly to the systems 600 and 600'. Thus, an incoming packet from the receive port 602A is written to the portion 604A of the receive buffer 604" corresponding to the port 602A. Similarly, an incoming packet from the receive port 602B is written to the portion 604B of the receive buffer 604" corresponding to the port 602B. Note that in this embodiment, an entire packet from the port 602A or 602B is received so that the dual traffic is transparent to upper layers (not shown in FIG. 13).

The scheduler 608" reads from either the receive buffer 604" or the internal wrap port 606". The scheduler 608" preferably selects between the portions 604A and 604B of the receive buffer 604" and the internal wrap port 606" using the following criteria. If there is no wrap packet at the internal wrap port 606", and the portions 604A and 604B of the receive buffer 604" are not empty, then the scheduler 608" preferably alternatively reads from the first portion 604A and the second portion 604B of the receive buffer 604" in a round-robin fashion. If there is no wrap packet at the internal wrap port 606" and only one of the first portion 604A and the second portion 604B of the receive buffer 604" is not empty, then the scheduler preferably reads exclusively from a not empty portion of the receive buffer 604". If there is a wrap packet at the internal wrap port 606" and the portions 604A and 604B of the buffer are empty, then the scheduler 608" preferably reads from the internal wrap port 606". If there is a wrap packet at the internal wrap port 606" and at least one of the portions 604A and 604B of the buffer are not empty and the threshold 612A and 612B, respectively have not been reached, then the scheduler alternately reads from the portions 604A and 604B of the buffer 604" that are not empty and the internal wrap port 606" in a round-robin fashion. If there is a wrap packet at the internal wrap port 606" and the threshold 612A and/or 612B has been reached or exceeded, then the scheduler 608" reads from the portion 604A and/or 604B of the buffer 604". Once the scheduler 608" has read the packet, the scheduler can provide the packet to the processor 610 (not shown in FIG. 12).

Through the use of the internal wrap port 606", packets can be transmitted back to the receive side without accessing the network. Thus, communication between applications of the computer system is allowed without requiring the packets to be transmitted over the network. Furthermore, the use of the receive buffer 604" may allow the packets from the receive ports 602A and 602B to be stored in the appropriate section 604A and 604B, respectively, of the buffer 604". Thus, there may be fewer dropped packets from the dual ports 602A and 602B. Consequently, performance is improved.

Figure 14:
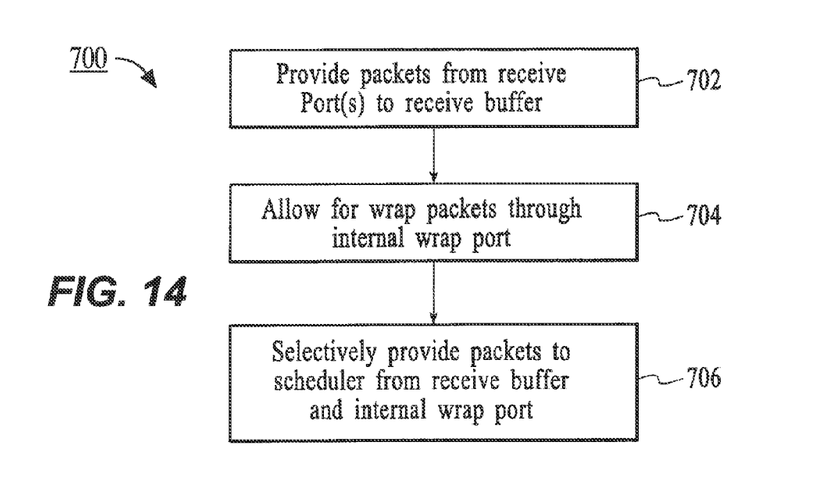
FIG. 14 is a flow chart depicting of one embodiment of a method for receiving packets in accordance with the present invention.

FIG. 14 is a flow chart depicting of one embodiment of a method 700 for receiving packets in accordance with the present invention. The method 700 is described in the context of the system 600. However, one of ordinary skill in the art will readily recognize that the method 700 could be used with other systems. Received packets from the receive port(s) 602 are provided to the receive buffer 604, via step 702. Wrap packets are also allowed in the system 600 through the use of the internal wrap port 606, via step 704. A portion of the received packets and a portion of the wrap packets are selectively provided to the scheduler 608, via step 706. In step 706, the scheduler 608" selectively reads from some portion of the buffer 604 and the internal wrap port 606. In a preferred embodiment, the criteria described above for the system 600' and 600" are used to determine from which component 604, 604', 604A or 604B and 606, 606' or 606", respectively, the packet is read in step 706.

Using the method 700, the internal wrap port 606 and receive port(s) 602 may be managed to allow for communication between applications via the wrap port 606 while reducing or eliminating dropped packets from the receive port(s) 602. Performance is thereby improved.

A method and system for more efficiently performing a packet header lookup has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for receiving packets in a computer network, the computer network including a network interface, the method comprising:
providing a plurality of received packets from at least one receive port to a buffer having an input and an output, the input coupled with the at least one receive port;
allowing a plurality of wrap packets to be received in a wrap port wherein the wrap port comprises hardware logic between transmit and receive sides of the network interface; and
selectively providing a portion of the plurality of received packets and a portion of the plurality of wrap packets to a scheduler having a first input, a second input, and an output, the output of the buffer coupled with the first input of the scheduler and the wrap port coupled with the second input.

2. The method of claim 1 wherein the buffer has a receive threshold.

3. The method of claim 2 wherein the at least one receive port is a ten gigabit per second port.

4. The method of claim 3 wherein the selectively providing further includes:
if there is no internal wrap packet and the buffer is not empty, reading from the buffer;
if there is an internal wrap packet, the buffer is not empty and the threshold has not been reached, alternatively reading from the buffer and the wrap port; and
if the threshold has been reached, reading from the buffer.

5. The method of claim 2 wherein the at least one port comprises two ports and the two ports include a first port and a second port.

6. The method of claim 5 wherein the buffer is divided into a first portion corresponding to the first port and a second portion corresponding to the second port.

7. The method of claim 6 wherein the first port and the second port is each an one gigabit per second port.

8. The method of claim 7 wherein the first portion of the buffer and the second portion of the buffer each has a maximum capacity of half of a buffer capacity.

9. The method of claim 7 wherein the selectively providing further includes:
if there is no internal wrap packet, the first portion of the buffer is not empty and the second portion of the buffer is not empty, alternatively reading from the first portion and the second portion of the buffer;
if there is no internal wrap packet and either the first portion of the buffer is not empty or the second portion of the buffer is not empty, reading exclusively from a not empty portion of the buffer;
if there is an internal wrap packet, the buffer is not empty and the threshold has not been reached, alternatively reading from the first portion of the buffer, the second portion of the buffer, and the wrap port; and
if there is an internal wrap packet and the threshold has been reached or exceeded for the first portion of the buffer or the second portion of the buffer, reading from the first portion or the second portion of the buffer.

10. A non transitory computer-readable medium containing a program for receiving packets in a computer network, the program including instructions for:
providing a plurality of received packets from at least one receive port to a buffer having an input and an output, the input coupled with the at least one receive port;
allowing a plurality of wrap packets to be received in a wrap port; and selectively providing a portion of the plurality of received packets and the plurality of wrap packets to a scheduler having a first input, a second input, and an output, the output of the buffer coupled with the first input of the scheduler and the wrap port coupled with the second input.

11. The non transitory computer-readable medium of claim 10 wherein the buffer has a receive threshold.

12. The non transitory computer-readable medium of claim 11 wherein the at least one receive port is a ten gigabit per second port.

13. The non transitory computer-readable medium of claim 12 wherein the selectively providing instructions further include instructions for:
if there is no internal wrap packet and the buffer is not empty, reading from the buffer;
if there is an internal wrap packet, the buffer is not empty and the threshold has not been reached, alternatively reading from the buffer and the wrap port; and
if the threshold has been reached, reading from the buffer.

14. The non transitory computer-readable of claim 10 wherein the at least one receive port comprises two receive ports ant the two receive ports include a first port and a second port.

15. The non transitory computer-readable medium of claim 14 wherein the buffer is divided into a first portion corresponding to the first port and a second portion corresponding to the second port.

16. The non transitory computer-readable medium of claim 15 wherein the first port and the second port is each an one gigabit per second port.

17. The non transitory computer-readable medium of claim 16 wherein the first portion of the buffer and the second portion of the buffer each has a maximum capacity of half of a buffer capacity.

18. The non transitory computer-readable medium of claim 16 wherein the selectively providing instructions further includes instructions for:
if there is no internal wrap packet, the first portion of the buffer is not empty and the second portion of the buffer is not empty, alternatively reading from the first portion and the second portion of the buffer;
if there is no internal wrap packet and either the first portion of the buffer is not empty or the second portion of the buffer is not empty, reading exclusively from a not empty portion of the buffer;
if there is an internal wrap packet, the buffer is not empty and the threshold has not been reached, alternatively reading from the first portion of the buffer, the second portion of the buffer, and the wrap port; and
if there is an internal wrap packet and the threshold has been reached or exceeded for the first portion of the buffer or the second portion of the buffer, reading from the first portion or the second portion of the buffer.

* * * * *